United States Patent [19]

Engel et al.

[11] Patent Number: 5,581,179
[45] Date of Patent: Dec. 3, 1996

[54] HALL-EFFECT FERROUS-ARTICLE-PROXIMITY SENSOR ASSEMBLY

[75] Inventors: Raymond W. Engel, Southbridge, Mass.; Peter J. Gilbert, Henniker, N.H.; Ravi Vig; Teri Tu, both of Bow, N.H.; Terry Clapp, Goffstown, N.H.

[73] Assignee: Allegro Microsystems, Inc., Worcester, Mass.

[21] Appl. No.: 454,916

[22] Filed: May 31, 1995

[51] Int. Cl.⁶ .............................. G01P 1/02; G01P 3/42; G01B 7/14; H05K 5/00
[52] U.S. Cl. .................. 324/207.2; 174/52.3; 324/174
[58] Field of Search ........................ 324/173, 174, 324/207.15, 207.2, 207.21, 207.25, 207.26, 235, 251, 252; 384/448; 174/52.1, 52.2, 52.3; 307/116, 117; 123/617; 73/517 R, 518–520, DIG. 3

[56] References Cited

U.S. PATENT DOCUMENTS

| | | |
|---|---|---|
| 3,636,767 | 1/1972 | Duffy . |
| 3,761,751 | 9/1973 | Fink et al. .............................. 310/168 |
| 4,011,476 | 3/1977 | Beard . |
| 4,207,519 | 6/1980 | Zatsepin et al. ....................... 324/235 |
| 4,311,981 | 1/1982 | Luzynski ............................... 338/32 H |
| 4,443,716 | 4/1984 | Avery . |
| 4,482,849 | 11/1984 | Doemen et al. . |
| 4,518,918 | 5/1985 | Avery ................................... 324/251 X |
| 4,859,941 | 8/1989 | Higgs et al. ........................ 324/251 X |
| 4,935,698 | 6/1990 | Kawaji et al. ....................... 324/207.2 |
| 5,045,920 | 9/1991 | Vig et al. . |
| 5,121,289 | 6/1992 | Gagliardi .............................. 324/207.2 |
| 5,321,355 | 6/1994 | Luetzow ............................... 324/174 X |
| 5,381,089 | 1/1995 | Dickmeyer et al. ..................... 324/174 |
| 5,414,355 | 5/1995 | Davidson et al. ................... 324/174 X |
| 5,416,410 | 5/1995 | Kastler .................................. 324/174 |
| 5,422,568 | 6/1995 | Hashizume et al. ................ 324/174 X |

FOREIGN PATENT DOCUMENTS

111662 7/1987 Japan .................................. 324/207.2

Primary Examiner—Gerard R. Strecker
Attorney, Agent, or Firm—Blodgett & Blodgett, P.C.

[57] ABSTRACT

This invention is a magnetic-field sensor assembly comprising a preformed housing shell having a first end which includes an opening, and a second end which includes a window and having a cylindrical shape with a flattened portion to produce a truncated circular cross-section, a sensor package including an integrated-circuit magnetic-field-sensor chip encapsulated in a protective body with first and second opposite and mutually parallel faces and a plurality of integral conductive leads, each lead having a proximal portion, a distal portion, and a central portion, the proximal portion of each of said plurality of leads extending from said body, the central portion of said plurality of leads extending away from the body and positioned substantially normal the faces of the body, said sensor-package body being positioned in said housing shell part way through said window with said one body face extending outwardly from said housing shell and with said lead distal portions extending from said housing shell through said opening, a magnet having a first end and a second end and positioned in said housing shell with said first end adjacent to said second sensor-package body face, and an endcap adapted to close said opening in said housing shell.

23 Claims, 9 Drawing Sheets

HALL-EFFECT FERROUS-ARTICLE-PROXIMITY SENSOR ASSEMBLY

BACKGROUND OF THE INVENTION

This invention relates to a proximity sensor assembly or module for detecting the passing of a ferromagnetic article such as a gear tooth, and more particularly to such a sensor comprising an assembly of a magnet structure and an integrated circuit chip having a Hall element, the chip being mounted at one end of the magnet structure and in the magnetic field created by the magnet structure, and a container. The Hall element generates an electrical signal related to the strength of the magnetic field normal to the plane of the Hall element. As a ferromagnetic article approaches the Hall element, the strength of the magnetic field normal to the Hall element is changed. Thus the distance between the article and the Hall element is reflected in the electrical signal generated by the Hall element. This allows the Hall-effect sensor to sense the distance between the sensor and ferromagnetic object.

A very appropriate application for a sensor of this type is in the measurement of rotational speed or rotational position of a gear or gear-shaped disk. By placing this type of sensor adjacent the periphery of the gear, the proximity, passing, and rate-of-passing of the gear teeth by the sensor is reflected in the electrical signal. Thus, the sensor can be used as a speedometer, tachometer, or for monitoring rotary or linear motion or position.

The typical Hall-effect sensor employs a magnet structure consisting of a cylindrical permanent magnet with a flat end. The Hall chip is positioned adjacent the flat end and with the plane of the Hall element parallel to the plane of the magnet end.

The integrated circuit chips of such typical proximity sensors almost always include an essentially linear Hall-voltage amplifier for amplifying the Hall output voltage. Also included in many such Hall integrated circuits is a Schmitt trigger circuit for producing a binary output signal that changes from one level (a standby level) to the other binary level (an action level) when a ferrous article approaches to within a critical distance at which the magnetic field, normal to a major face of the chip, exceeds a predetermined magnitude. These circuits are normally DC connected so that the sensor is capable of sensing passing ferrous articles at zero rate (e.g. one a year) up to a high rate (e.g. 100 KHz).

In the past, proximity sensor units tended to be developed as an application-specific unit with a casing that allows the unit to be mounted and positioned at the sensing location, with a plug-type connector to allow the unit to communicate through wire to a remote signal processing system, and with application-specific circuitry within the casing for processing the sensor signal so that it is suitable for transfer through the wire to the remote equipment.

Most of the aspects of this overall unit (mounting, signal-processing, plugging) are quite fault tolerant and the accuracy and environmental sensitivity requirements of these aspects can be easily satisfied using normal design and manufacturing tolerances and approaches. Unfortunately, this is not true of the sensor aspect or section of the unit. The physical relationship and stability of the Hall sensor components (the Hall element and chip, the leads from the chip, the magnet, and the directly associated components) to one another and appropriate protection of the sensor elements from environmental damage are critical to the accuracy and usefulness of the sensor signal.

This creates a serious design and manufacturing problem for the units. If the whole unit is designed and manufactured using normal standards, the sensor aspect is often not reliable. If, on the other hand, the unit is designed and manufactured to the standard required by the sensor section, the cost of the entire unit is often unacceptably high. Efforts to impose different standards on the sensor section versus the other sections adds to the costs and can be impractical. Furthermore the cost of designing a high quality sensor section for each new application situation imposes unacceptable high costs on the project and frequently fails to allow accumulation of data on the long-term characteristics of a particular design to allow accurate long-term reliability forecasts. Lack of accurate long-term reliability forecasts can create unexpected product failures, possible product liability, and expensive product recall requirements.

These and other difficulties experienced with the prior art devices have been obviated in a novel manner by the present invention.

It is, therefore, an outstanding object of the present invention to provide a gear tooth sensor module designed to allow flexible use of the module as a subassembly in a wide range of equipment and situations.

Another object of this invention is to provide a gear tooth sensor module which is itself a rugged and stable unit capable of enduring wide-ranging environmental conditions without deterioration.

A further object of the present invention is to provide a gear tooth sensor module that can be provided as a basic magnet holder, with or without printed circuit board attached, or as a finished over-molded module with or without proper application (e.g., automotive) connector attached, either using a shell and O-rings or by direct over-molding of the sensor module.

It is another object of the invention is to provide a gear tooth sensor module which can be assembled of preformed parts and in a simple manner which is conducive to reliable automated assembly.

A still further object of the invention is to provide a gear tooth sensor module with internal lead jigging and lead and component short-circuit prevention.

It is a further object of the invention to provide a gear tooth sensor module with lead separation and directional selection at the exit of the leads from the module.

It is a further object of the invention to provide a gear tooth sensor module which provides a positive bias of the sensor chip toward the magnet in order to provide positional stability and therefore signal stability over a wide range of thermal cycles.

It is a further object of the invention to provide a gear tooth sensor module which allows different magnet materials and sizes, different lead lengths on the sensor package, various PC board designs (through hole or surface mount), and vertical or horizontal mounting.

It is a further object of the invention to provide a gear tooth sensor module which allows inclusion of a PC board and associated electronics, which reduces the number of connections between the module and the application connector and thereby provides maximum reliability.

It is a further object of the invention to provide a gear tooth sensor module which is capable of being manufactured of high quality and at a low cost, and which is capable of providing a long and useful life with a minimum of maintenance.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

SUMMARY OF THE INVENTION

This invention is a magnetic-field sensor assembly comprising a preformed housing shell having a first end which includes an opening, and a second end which includes a window, a sensor package including an integrated-circuit magnetic-field-sensor chip encapsulated in an protective body with first and second opposite and mutually parallel faces and a plurality of conductive leads, each lead having a proximal portion, a distal portion, and a central portion, the proximal portion of each of said plurality of leads extending from said body, the central portion of said plurality of leads extending away from the body and positioned substantially normal to the faces of the body, said sensor-package body being positioned in said housing shell part way through said window with said first body face extending outwardly from said housing shell and with said lead distal portions extending from said housing shell through said opening, a magnet having a first end and a second end and positioned in said housing shell with said first end adjacent to said second sensor-package body face, and an endcap adapted to close said opening in said housing shell.

The sensor assembly is especially adapted for detecting the passage or presence of adjacent ferromagnetic objects, and especially ferromagnetic gear teeth.

The sensor assembly housing shell is preformed and of such dimensions with respect to the other components that, when the assembly is formed, the sensor package and magnet are biased toward one another. The sensor assembly adjacent leads are spaced apart a constant distance along the entire lead length. The sensor assembly leads extend from the chip body in a proximal lead plane that is parallel with the planes of said faces and spaced from the plane of the said second face so that the portion of the leads in the proximal lead plane do not extend into the plane of the said first face.

The sensor assembly housing shell is provided with an inner surface with a side wall between the ends of the housing shell, which side wall has a first curved portion and a second portion which forms a flat structure. The sensor assembly housing shell is provided with an outer surface between the ends of the housing shell, which outer surface has a cross-section in the form of a first truncated circle, and wherein said housing shell is provided with an inner surface with a first side wall between the ends of the housing shell, which side wall has a curved portion and a second portion which forms a flat structure, so that the inner surface, as defined by the curved portion and the flat structure, has a cross-section in the form of a second truncated circle, and grooves formed in the said second portion allow the leads to pass along the shell within the cross-sectional segment which complements the said second truncated circle, so as to allow minimization of the diameter of the said first truncated circle.

The sensor assembly housing shell is provided with an inner surface with a side wall between the ends of the housing shell, which side wall has a first curved portion and a second portion which forms a flat structure, said second portion being formed of parallel lands and grooves, said grooves being adapted to receive and maintain a fixed parallel spacing of the leads as they pass through the inside of the housing shell. The sensor assembly housing shell is provided with an inner surface which includes grooves which have a bottom and two upper edges, and which grooves are deep enough that when a lead is placed in the bottom of a groove, the uppermost part of the lead is substantially below the upper edges of the groove, so that a flat object resting on the upper edges of the groove will not be in contact with the lead.

The sensor assembly housing shell is provided with an inner surface which includes grooves which have a bottom and two upper edges, and which grooves are deep enough that when a lead is placed in the bottom of a groove, the uppermost part of the lead is substantially below the upper edges of the groove, so that a flat object resting on the upper edges of the groove will not be in contact with the lead, and wherein the chip body is held immovable and as a result the proximal ends of the leads are held at the bottom of the grooves, and wherein the endcap is provided with endcap grooves which engage the distal portion of the leads and as a result the distal portion of the leads are held at the bottom of the grooves, so that the leads are held at the bottom of the grooves and separate from one another.

The sensor assembly first face of said body has at least two opposite edges that are beveled, and the said window of said shell has at least two opposite edges that have inwardly-facing bevels, the beveled edges of said face conforming to the bevels of said window so that the body is stopped from exiting through said window, and the body is restricted from lateral movement with respect to the shell.

The sensor assembly chip and said magnet are dimensioned so that they can both pass through the opening, so that the assembly can occur through the opening, but said chip and said magnet are too large to pass through the window.

The sensor assembly first end of said shell includes a plurality of notches into which the leads can be bent so that the leads do not extend rearward of the said first end of the shell. The sensor assembly endcap is provided with endcap grooves each of which engages the distal portion of the separate lead as it exits the shell and as a result the distal portion of the leads are held separate as they exit the shell.

The sensor assembly is designed to be modular so that it can be associated with a range of signal processing equipment. The sensor assembly additional electronic circuitry is physically associated with the endcap and adapted to be electrically connected to at least one of the leads.

The sensor assembly magnet has a cross-section in the form of a truncated circle, and more specifically, the sensor assembly magnet is in the shape of a right cylinder having a generatrix in the form of a truncated circle and the magnet has an outer surface with a planar longitudinal portion.

BRIEF DESCRIPTION OF THE DRAWING

The character of the invention, however, may be best understood by reference to one of its structural forms, as illustrated by the accompanying drawings, in which.

DESCRIPTION OF THE PREFERRED EMBODIMENT

Figure 5:
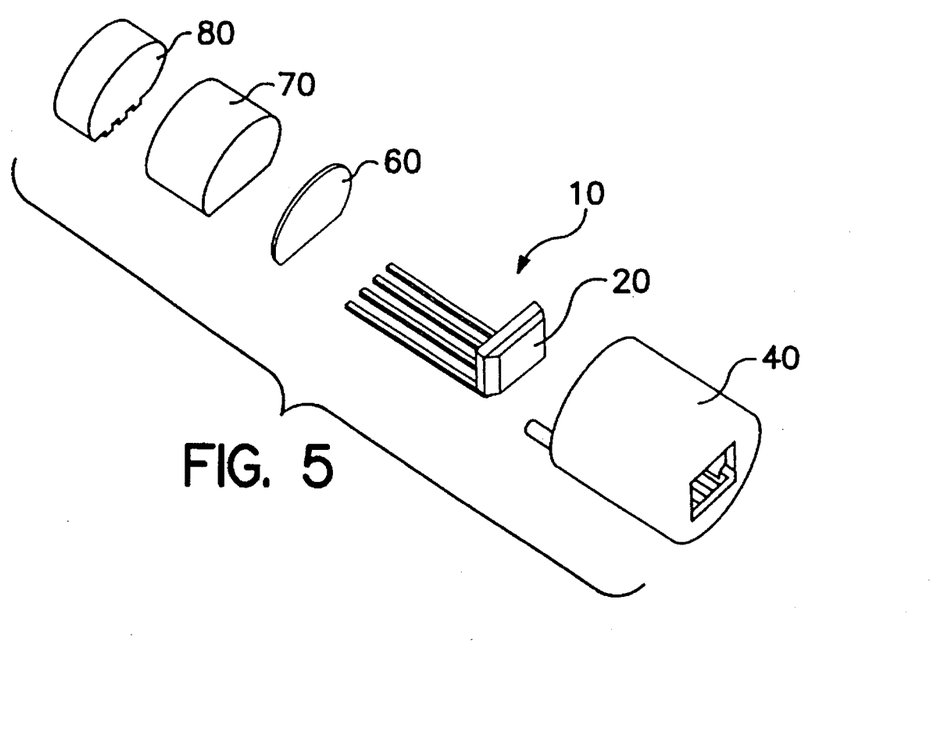
FIG. 5 is a perspective assembly view of the elements of the sensor package embodying the principles of the present invention as shown in FIG. 1.

Referring first to FIG. 5 in which the general features of the present invention are best shown, the sensor package, denominated generally by the numeral 10, is shown to include a Hall-Effect IC chip 20, a case 40, a concentrator 60, a magnet 70 and an end cap 80.

Figure 2:
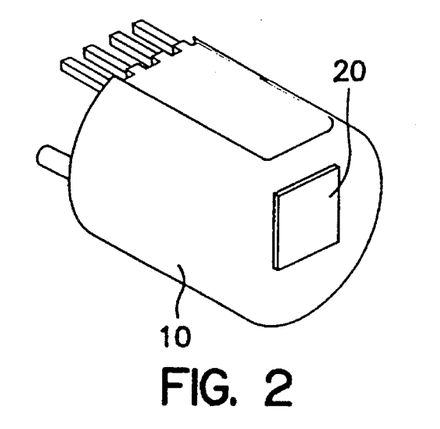
FIG. 2 is a perspective view of the underside of the sensor package shown in FIG. 1.
Figure 3:
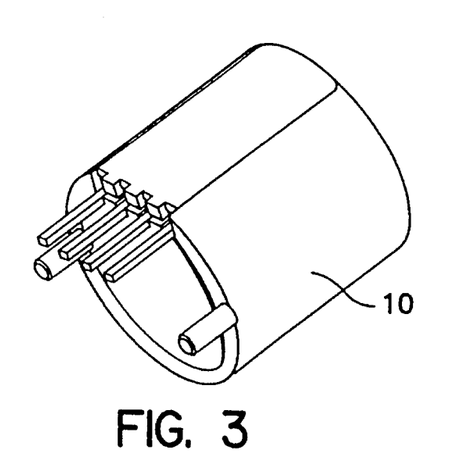
FIG. 3 is a perspective of the underside and back of the sensor package shown in FIG. 1.
Figure 6:
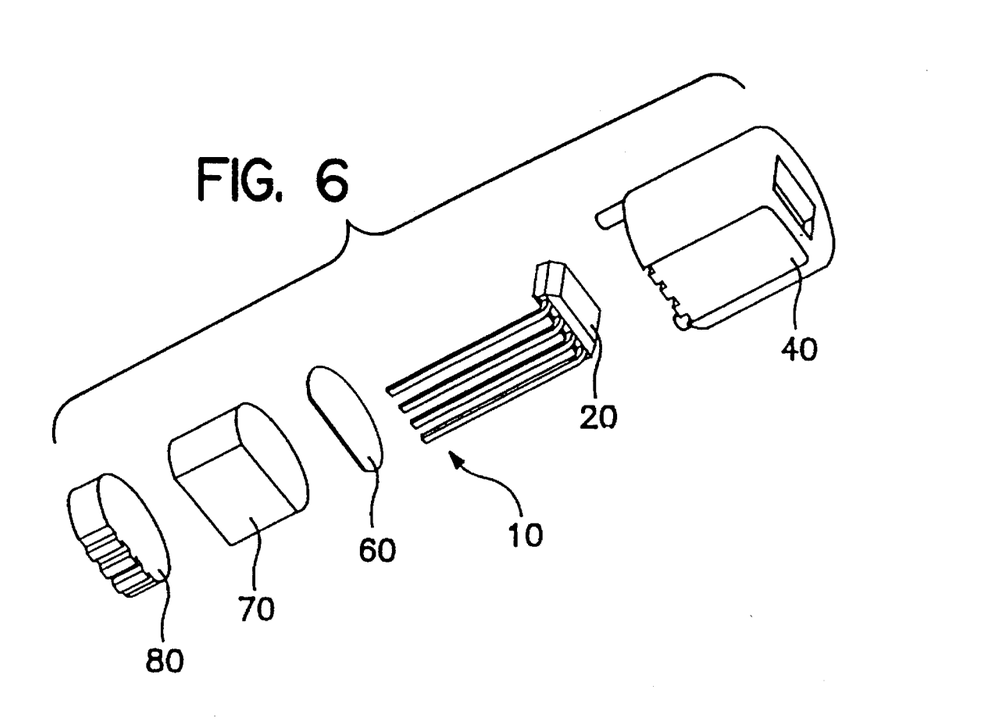
FIG. 6 is a perspective underside assembly view of the sensor package shown in FIG. 1.

FIG. 6 shows the underside view of the assembly of material shown in FIG. 5. Of particular significance is the flattened section of each of the elements of the sensor package on the bottom surface. When each of the elements is serially placed through the rear opening of the case 40, the sensor package takes on the form shown in upright configuration in FIG. 1, in front inverted position shown in FIG. 2 and rear inverted position shown in FIG. 3.

Figure 4:
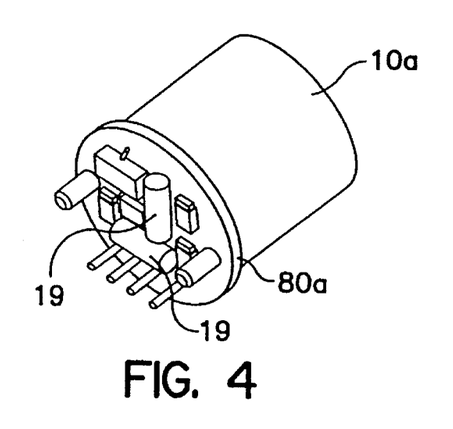
FIG. 4 is a perspective view of the backside of an alternative sensor package embodying the principles of the present invention and including back-mounted electronic circuitry.

FIG. 4 shows an alternative embodiment 10A in which electronic components 19 are mounted on, or adjacent to the end cap 80A.

Figure 7:
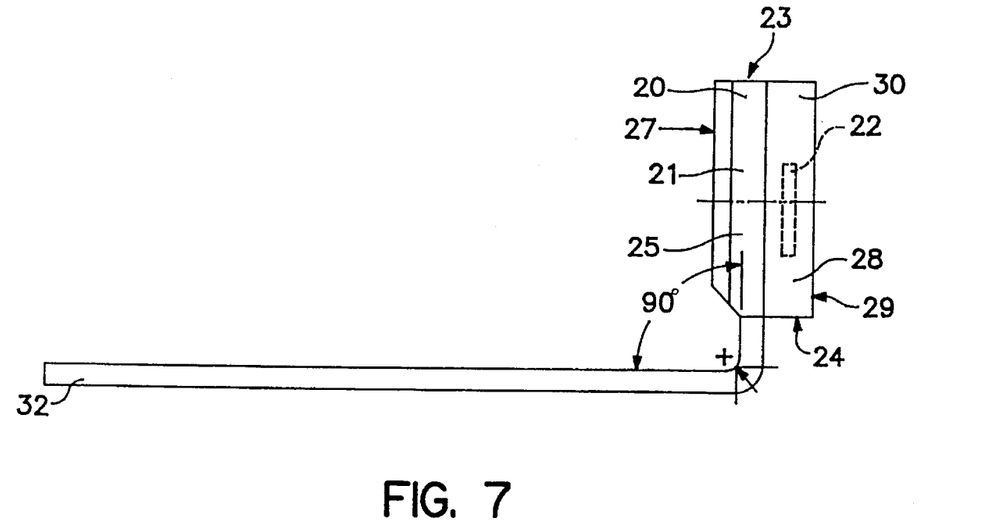
FIG. 7 is a side view of the Hall-element integrated circuit chip employed in the present invention.
Figure 8:
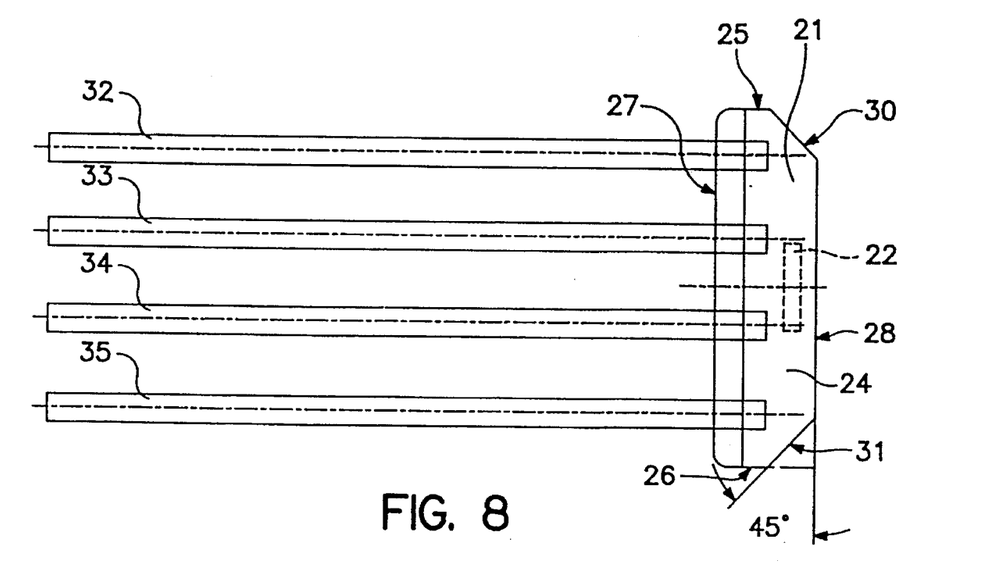
FIG. 8 is a bottom plan view of the IC chip shown in FIG. 7.

FIGS. 7 and 8 show a side elevational view and a bottom plan view, respectively, of the Hall-effect integrated chip 20 which is part of the sensor package of the present invention. The integrated chip 20 includes a body 21 which typically is polymeric or ceramic and which encapsulates a Hall-effect element 22 and other electronics conventionally associated with using the Hall-element to detect magnetic fields. The outside of the body 21 has a generally planar top surface 23, a generally planar bottom surface 24, generally planar side surfaces 25 and 26 and generally planar back surface 27. The front surface 28 includes a generally planar front face 29 and 45° side chamfers 30 and 31 on each side of the front face. The Hall-element 22 is buried slightly below and parallel to the front face 29 of the body 21. The front face 29 and the back surface 27 and the Hall-element 22 are substantially parallel.

Four terminals, 32, 33, 34 and 35, each have a proximal end which exits from the bottom surface 24 of the body 21. Each terminal also has a distal end which extends a distance from the body 21.

Each terminal exits from a separate point along a line approximately half-way between the front face 29 and the back surface 27. The proximal end of each terminal travels from the body 21 parallel to the back surface 27 of the body 21. After a distance, each terminal has a 90° bend so that each terminal extends backward from the chip body 21. The terminals are parallel to one another.

Each terminal has a parallel portion which carries the terminal away from the body 21 and parallel to the front face 29 and back surface 27 of the chip, and a normal portion which is normal to the front face 29 and back surface 27 of the chip body 21. The rearward most portion of the parallel portion of each terminal is substantially offset forward of the plane of the back surface 27 to physically and electrically isolate the parallel portion of each terminal from other parts of the sensor package.

The uppermost portion of the normal portion of each terminal is spaced substantially below the plane of the bottom surface 24 of the body 21. This physically and electrically separates the terminals from certain other parts of the sensor package.

Figure 9:
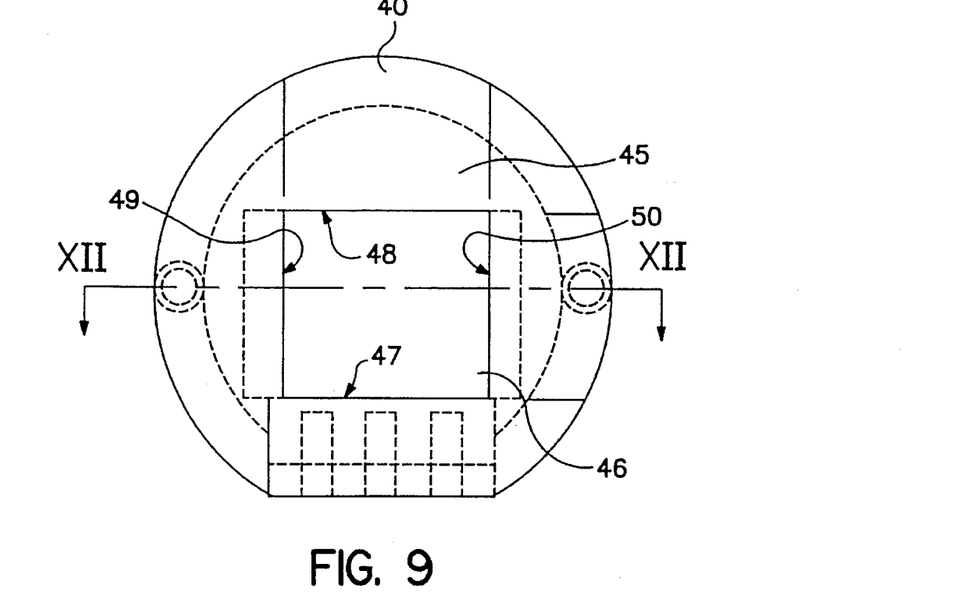
FIG. 9 is a front elevational view of the case which is a part of the sensor package shown in FIG. 1.

FIG. 9 shows a front elevational view of the case 40 which encloses certain other elements of the sensor package. The case 40 is shown to have a cross-section represented by a truncated circle, that is, a circle truncated along a cord of the circle to form a flat. The case 40 is roughly in the shape of a right-truncated-circular cylinder. That is, a cylinder having substantially flat ends perpendicular to the axis of the cylinder and having a generatrix which is a truncated circle. The front surface 45 has a rectangular window 46. The window 46 has a lower edge 47 which is parallel to the truncation. The window also has a top edge 48 and side edges 49 and 50.

Figure 10:
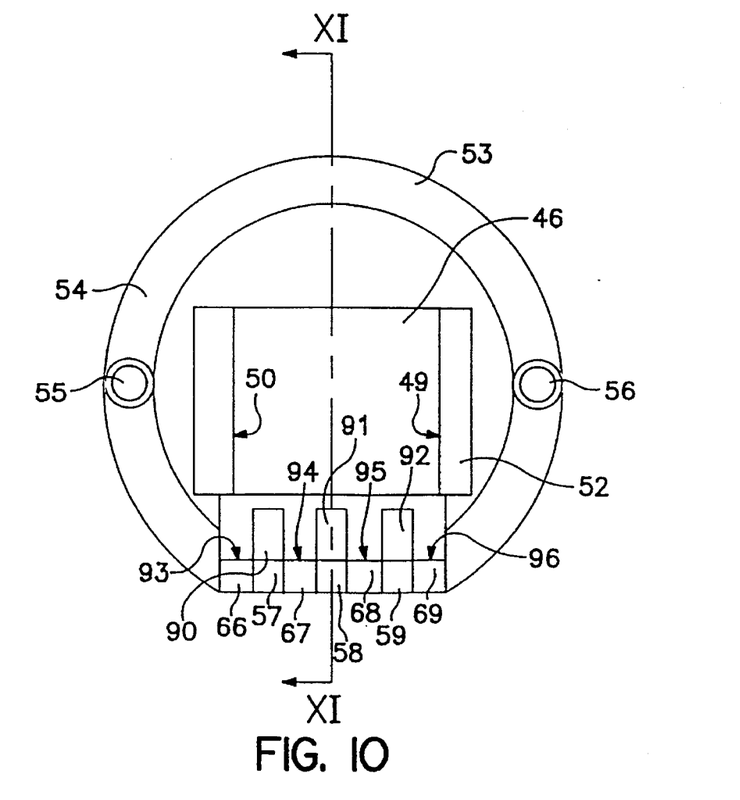
FIG. 10 is a rear elevational view of the case which is a part of the sensor package in FIG. 1.

FIG. 10 shows a rear elevational view of the case 40. The window 46 is shown to have a 45° chamfer 51 and 52 on each side edge 49 and 50 of the window 46. The case 40 has an annular side wall 53 having a rear edge 54 which carries attachment standoffs 55 and 56 which can be used to attach the case 40 to another object.

The side wall 53 is interrupted by notches 66, 67, 68 and 69 which form separators 57, 58 and 59. As one looks into the interior of the case 40, there can be seen lands 90, 91 and 92 and grooves 93, 94, 95 and 96 along the truncated, or flattened portion of the side wall 53.

Figure 11:
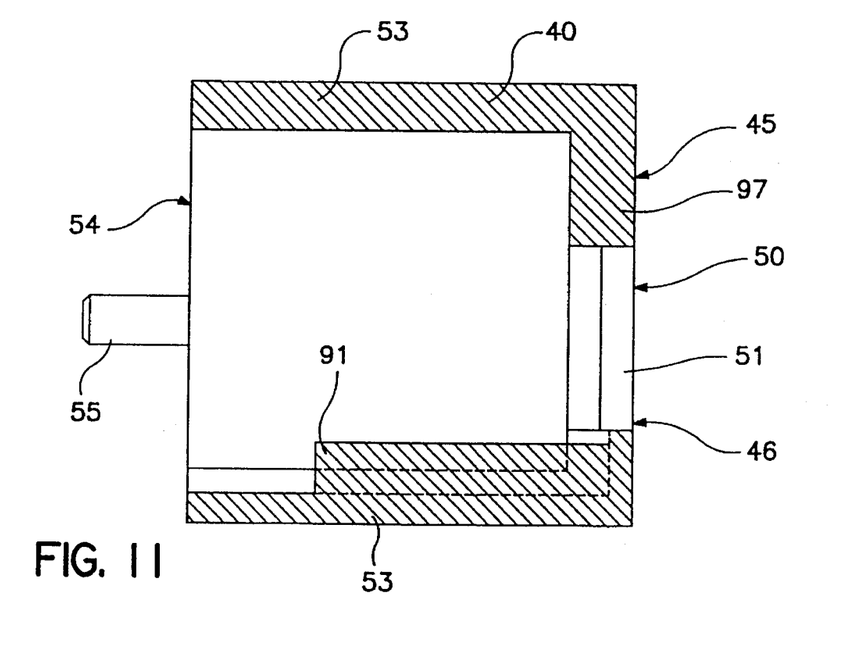
FIG. 11 is a sectional view taken along line XI—XI of FIG. 10 of a case which is a part of the sensor package shown in FIG. 1.

FIG. 11 is a sectional left elevational view of the case 40 taken along line XI—XI of FIG. 10. The cylindrical sidewall 43 encloses an interior space. The from surface 45 corresponds to the front wall 97 in which the window 46 is positioned. Along the side edge 49 of the window 46 is chamfer 51. Standoff 55 extends from the rear edge 54 of the wall 53.

Figure 12:
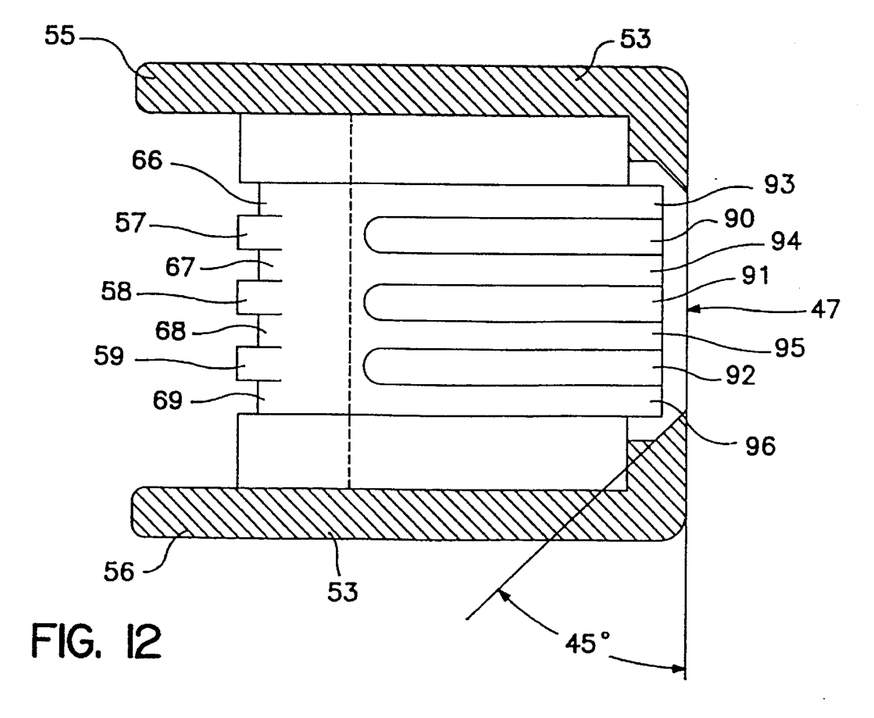
FIG. 12 is a sectional view taken along line XII—XII of FIG. 9 of a case which is part of the sensor shown in FIG. 1.

FIG. 12 is a sectional view taken along line XII—XII of FIG. 9.

Figures 13, 14, 15:
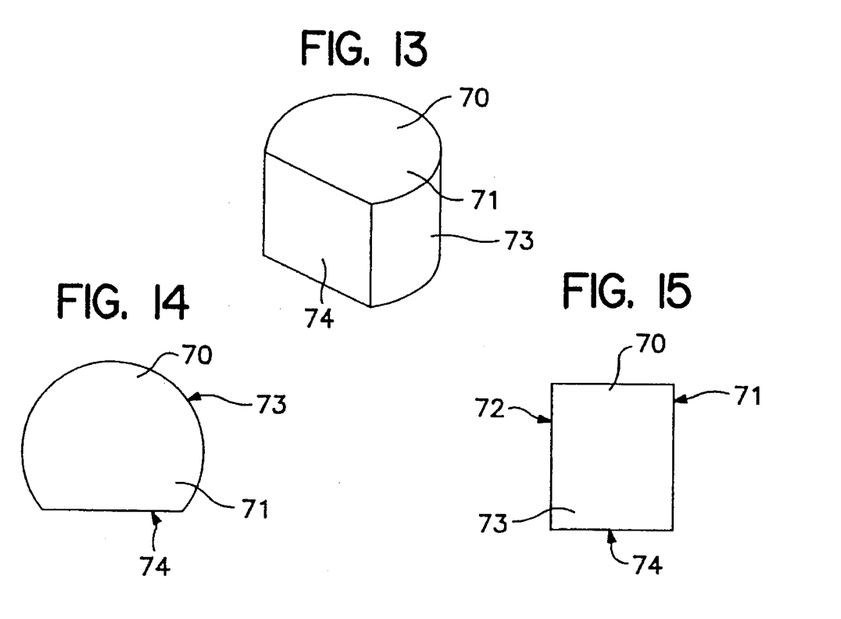
FIG. 13 is a perspective view of the magnet which is a part of the sensor package shown in FIG. 1.
FIG. 14 is a front elevational view of the magnet shown in FIG. 13.
FIG. 15 is a side elevational view of the magnet shown in FIG. 13.

FIG. 13 is a perspective view of the magnet 70 positioned to best show its shape. The magnet is a right truncated-circular cylinder having a flat from surface 71 perpendicular to the axis of the magnet. The magnet also has a flat rear surface 72 perpendicular to the axis of the magnet as shown in FIG. 15. The cylinder walls have a curved portion 73 and a flat portion 74.

FIG. 14 is a front elevational view of the magnet shown in FIG. 13.

Figure 16:
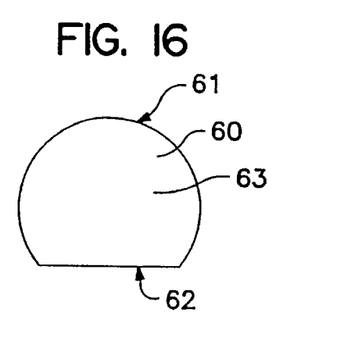
FIG. 16 is a front elevational view of a concentrator which is a part of the sensor package shown in FIG. 1.
Figure 17:
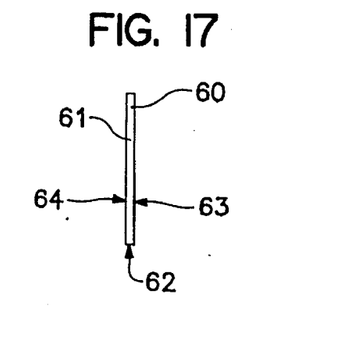
FIG. 17 is a side elevational view of the concentrator shown in FIG. 16.

FIG. 16 shows a front elevational view of the concentrator 60 and FIG. 17 shows a side elevational view. The concentrator 60 is a thin, flat plate formed of ferromagnetic material and capable, when positioned on the pole of a magnet to modify the magnetic field produced at that pole. The concentrator has the shape of a truncated circle and has a curved edge 61 and a flat edge 62. The concentrator has a front surface 63 and a rear surface 64. The cross-section, or generatrix, of the magnet 70 and the concentrator 60 are identical.

The magnet 70 can be a standard magnet with one magnetic pole on the front face 72 and the other magnetic pole on the rear surface 72. It could also be any other suitable magnetic configuration, for example, it could be a sandwich magnetic in which both the north and south poles are present on the front surface 71. This could be accomplished by placing north and south magnets together with their separation along the axis of the magnet. It can also be accomplished by sandwiching a north-south magnet, or a ferromagnetic pole piece between the two south-north magnets.

Although the Hall-effect IC chip 20 shown in FIG. 7 is of the type which employs a single Hall element 22, this invention includes the concept of having two separate Hall-effect elements which are electrically connected so that suitable compensation and suitable signal improvement can be accomplished, as is well known in the art of Hall-effect devices.

The case 40 is preferably formed of a polymeric insulating material, and preferably material which has some elasticity. It has been found that the elasticity of the case can improve the reliability of the sensor package because the package tends to maintain its integrity and its sealing function through the substantial thermal cycling which is typical in the use environments of this type of sensor.

Figure 18:
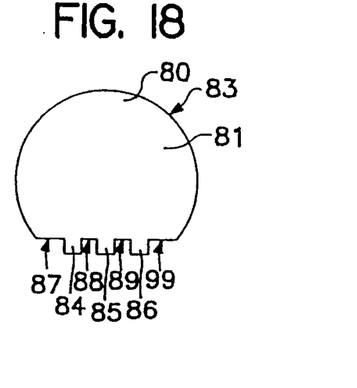
FIG. 18 is a front elevational view of the end cap which is a part of the sensor package shown in FIG. 1.
Figure 19:
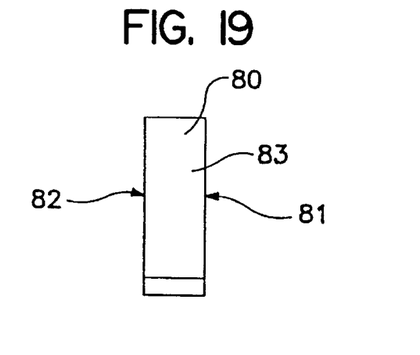
FIG. 19 is a side elevational view of the end cap shown in FIG. 18.

FIG. 18 shows a front elevational view of the end cap 80 and FIG. 19 shows a side elevational view. The end cap 80 is a right cylinder with a generatrix which forms a curved surface 83, a series of lands 84, 85 and 86 separated by a series of co-planar grooves 87, 88, 89 and 99. It is significant to note that the cross-section of the end cap corresponds to the cross-section of the magnet 70 and concentrator 60, except that the lands and grooves of the end piece 80 are positioned more radially outward than the flat potions 74 and 62 of the magnet 70 and concentrator 60, respectively. The end cap 80 has a flat front surface 81 which is perpendicular to the axis of the end cap and a flat back surface 82 which is perpendicular to the axis of the end cap.

Figure 1:
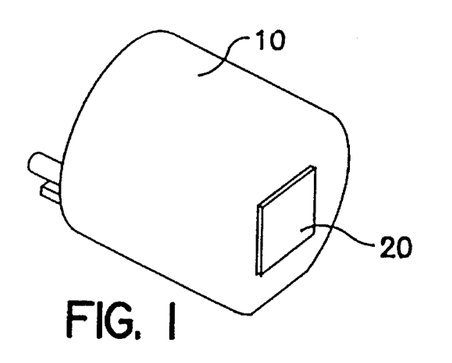
FIG. 1 is a perspective view of a sensor package embodying the principles of the present invention.
Figure 20:
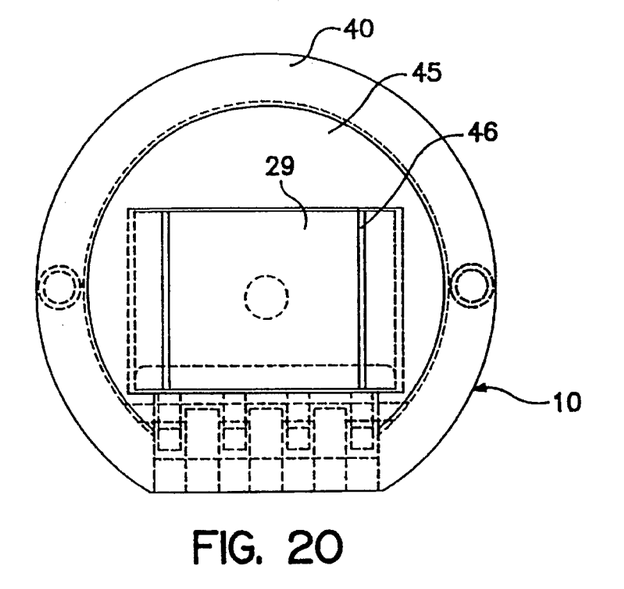
FIG. 20 is a front elevational view of the sensor package shown in FIG. 1.

FIG. 20 shows a front elevational view of the completed and sealed sensor package 10, shown in FIG. 1. The front face 29 of the IC chip 20 shows through the window 46 in the from surface 45 of case 40.

Figure 21:
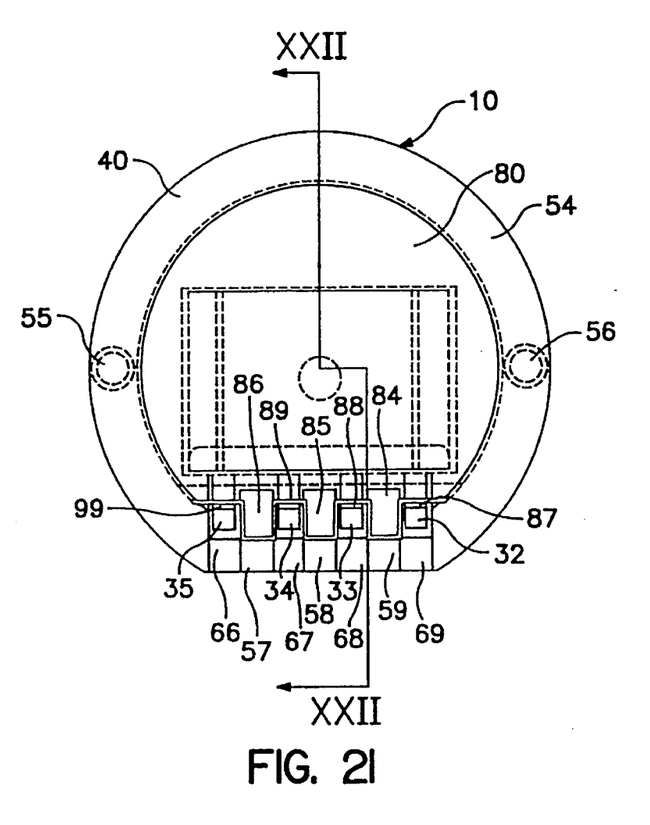
FIG. 21 is a rear elevational view of the sensor package shown in FIG. 1.

FIG. 21 shows a rear elevational view of the completed and sealed sensor package shown in FIG. 1 and in FIG. 20. The end cap 80 fits inside of the rear edge 54 of the case 40 and the end cap 80 and case 40 are sealed together by conventional means such as ultrasonic welding.

The terminals 32, 33, 34 and 35 extend outward from the rear of the sensor unit through grooves 87, 88, 89 and 99 between lands 84, 85 and 86 of end cap 80. The lands 84, 85 and 86 on the end cap 80 are bonded to separators 57, 58 and 59, respectively, on the case 40. The terminals 32, 33, 34 and 35 extend over the notches 66, 67, 68 and 69, respectively on the case 40. This allows the distal ends of the terminals to be bent down into notches 66, 67, 68 and 69 and between separators 57, 58 and 59 in order to provide an alternate arrangement for the distal ends of the terminals.

Figure 22:
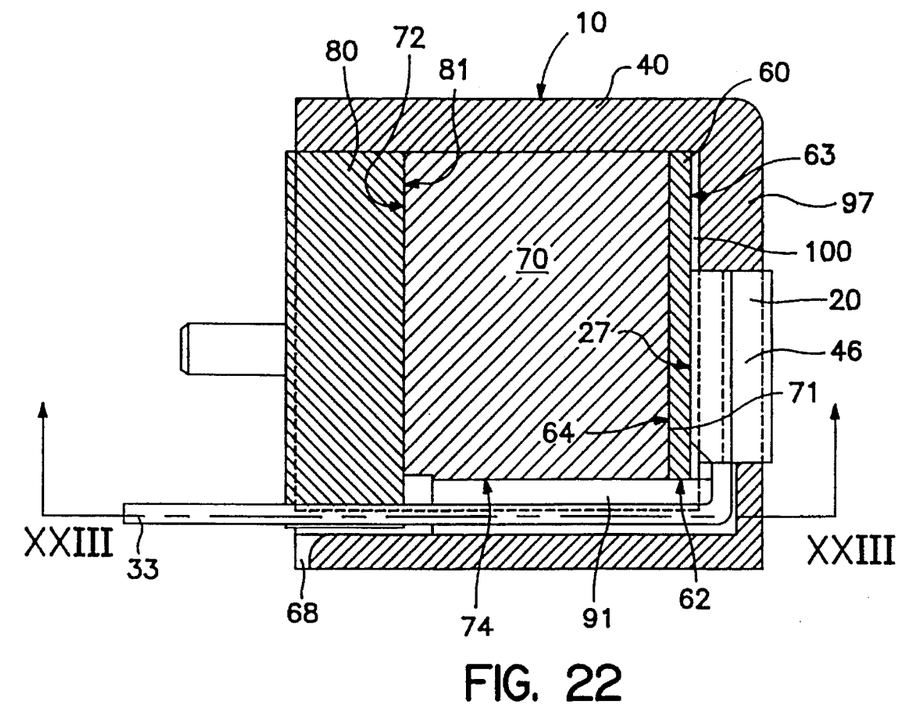
FIG. 22 is a sectional view, taken along line XXII—XXII of FIG. 21 of the sensor package shown in FIG. 1.

FIG. 22 shows a sectional left elevational view taken along line XXII—XXII of FIG. 21. This figure shows how the various parts of the sensor package fit together. The IC chip 20 is positioned in the window 46 in the front wall of the case 40. The terminals of the IC chip 20 extend rearwardly out the back end of the sensor package 10.

The front surface 63 of the concentrator 60 is pressed against the back 27 of the IC chip 20. The flat edge 62 of the concentrator rides on the upper surface of the lands 90, 91 and 92, of which lands 91 is shown in FIG. 22. A space 100 is provided between the concentrator 60 and the front wall 97 of the case 40 so that forwardly directed pressure from concentrator 60 acting upon the chip 20, combined with the slight elasticity in the front wall 97 of the case 40, brings about pressure contact and sealing between the chip 20 and the edges of the window 46 in the from wall 97 in case 40 and thereby maintains a good seal between the chip and the case under varying operating conditions including thermocycling. The front 71 of the magnet 70 presses against the rear surface 64 of the concentrator 60. The flat portion 74 of the magnet 70 rests upon the lands 90, 91 and 92 and specifically, land 91 shown in FIG. 22.

The front 81 of the end cap 80 presses against the rear surface 72 of the magnet 70. The lands 84, 85 and 86 and the grooves 87, 88, 89 and 99 of the end cap 80 extend below the plane defined by the flat surface 62 of the concentrator 60 and the flat surface 74 of the magnet 70 and the grooves 87, 88, 89 and 99 press the terminals downward against the wall of the case. Because the chip 20 is locked and pressed into the window 46, and because the concentrator 60 and magnet 70 sit on the upper edge of the lands, including land 91, and the distal ends of the terminal are held in place by the end cap 80, and because of the offset of the distal end of the terminals forward of the rear surface of the chip 20, a substantial space is maintained between the terminals and the concentrator 60 and magnet 70. This space, of course, is critical to avoiding short-circuiting between the terminals caused by the normally electrically conductive concentrator 60 and magnet 70.

The end cap 80 is pressed into the case 40 and welded to the case 40 around the peripheral edge of the end cap 80. This imposes a slight compression on the contents of the package and tends to stabilize the parts and improve the sealing characteristics.

It can be seen that the distal ends of the terminals, for example, the distal end of terminal 33, exits above the notches, for example notch 68, in the case 40. The notches, for example notch 68, allow the distal end of the terminals, for example terminal 33, to be bent 90° downward so that the then rearward facing surface of the terminal is co-planar with the rear surface of the end cap 40 to allow for alternate configurations of the sensor package, for example, for surface mounting.

Figure 23:
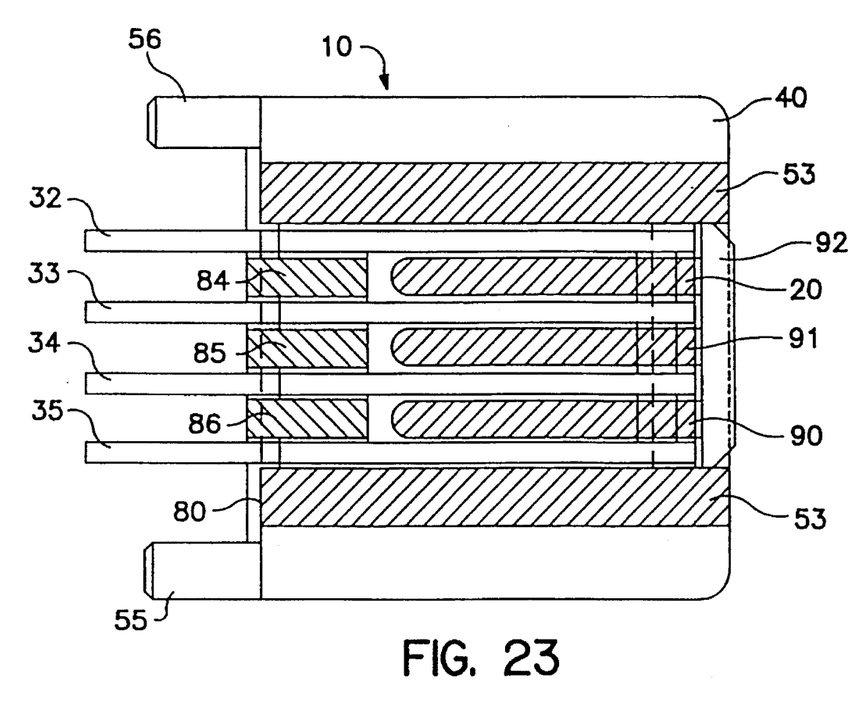
FIG. 23 is a sectional view, taken along line XXIII—XXIII of FIG. 22 of the sensor package shown in FIG. 1.

FIG. 23 shows a sectional bottom view of the sensor package taken along line XXIII—XXIII of FIG. 22. It can be seen that the terminals 32, 33, 34 and 35 exit from the chip 20. They then pass between and are maintained parallel by the case wall 53 and the lands 90, 91 and 92. The terminals then pass between and are held parallel by the wall 53 of the case 40 and the lands 84, 85 and 86 of the end cap 80.

Figure 24:
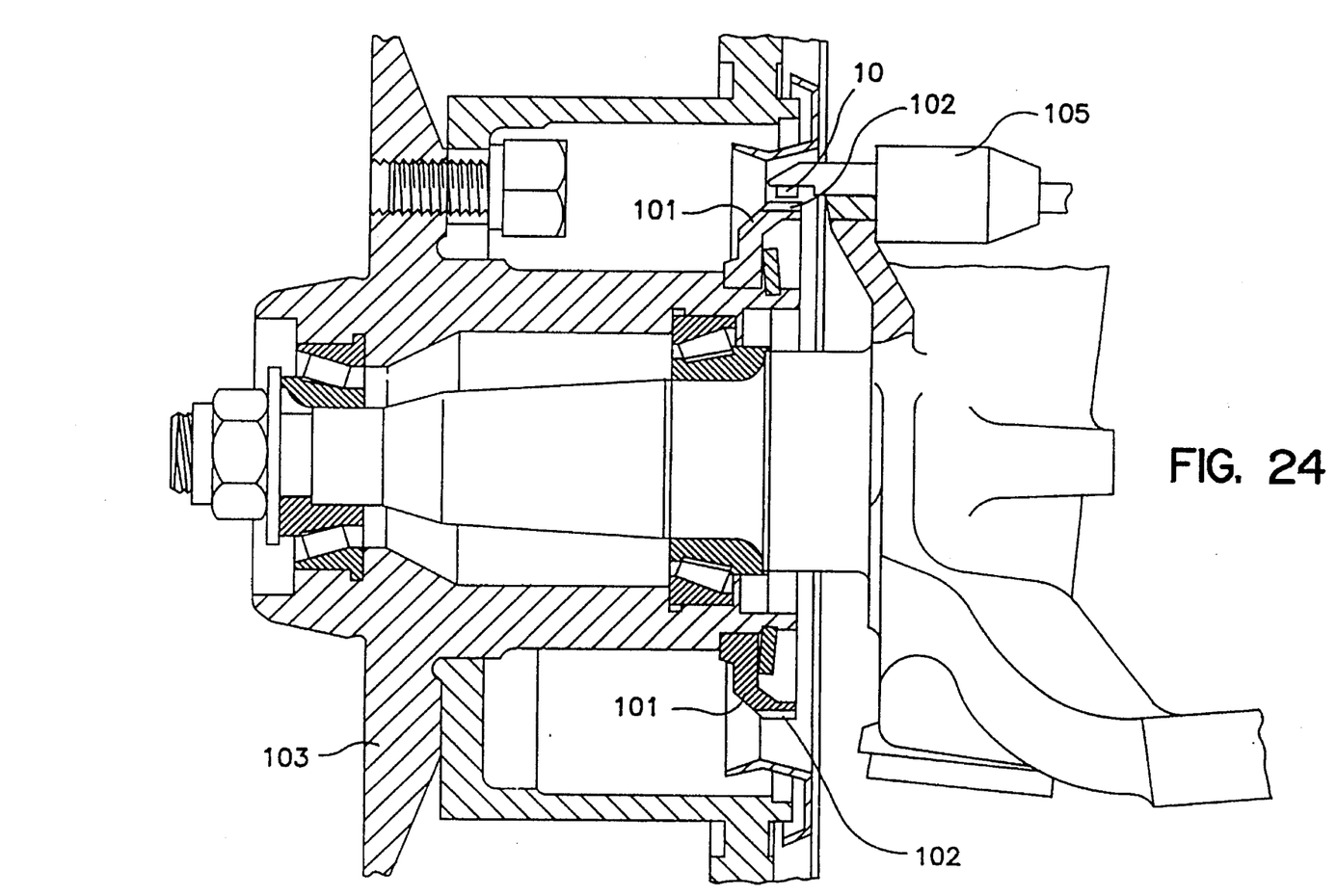
FIG. 24 is a sectional view of an application environment in which the sensor package shown in FIG. 1 can be employed, and more specifically, the figure shows the wheel axle end of an automobile.

FIG. 24 shows a sensor package 10 of the present invention in a typical application situation. In this case, the sensor package 10 is positioned with its front surface facing the outer periphery of a toothed gear wheel 101 having teeth 102. The gear wheel 101 is coaxial with and connected to an axle mounted wheel of a vehicle so that the rotation of the wheel 103 of the vehicle is proportional to the rotation of the gear 101. The sensor package 10 is able to monitor the passage of the gears before the face of the sensor 10 and produce an electrical signal related to the speed at which the teeth are passing the sensor 10. The electrical signal is processed in a signal processor 105 which, in turn, passes the signal to the user in a form suitable for use. For example, the sensor can be used to determine the speed of a vehicle, to determine engine speed, and to control the firing of spark plugs by monitoring the position of a cam within a distributor.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described what is claimed as new and desired to secure by Letters Patent is:

1. A magnetic-field sensor assembly comprising:
   (a) a preformed housing shell having a first end which includes an opening with a periphery, and a second end which includes a window, and having an external cylindrical shape with a flattened portion to produce a truncated circular cross-section;
   (b) a sensor package including an integrated-circuit magnetic-field-sensor chip encapsulated in a protective body with a second opposite and mutually parallel faces and a plurality of integral conductive leads, each lead forming an uninterrupted conductive path from said chip within said protective body through said first end opening, each lead having a proximal portion, a distal portion, and a central portion, the proximal portion of each of said plurality of leads extending from said body, the central portion of said plurality of leads extending away from the body and positioned substantially normal the faces of the body, said sensor-package body being positioned in said housing shell part way through said window with said first body face extending outwardly from said housing shell and with said lead distal portions extending from said housing shell through said opening at the periphery;
   (c) a magnet having a first end and a second end and positioned in said housing shell with said first end adjacent to said second sensor-package body face; and
   (d) closing means adapted to close said opening in said housing shell.

2. A sensor assembly as recited in claim 1, especially adapted for detecting the passage of adjacent ferromagnetic objects.

3. A sensor assembly as recited in claim 1, especially adapted for detecting the presence of adjacent ferromagnetic objects.

4. A sensor assembly as recited in claim 1, especially adapted for detecting the passage of adjacent ferromagnetic gear teeth.

5. A sensor assembly as recited in claim 1, especially adapted for detecting the presence of adjacent ferromagnetic gear teeth.

6. A sensor assembly as recited in claim 1, wherein the housing shell is preformed and of such dimensions with respect to the other components that, when the assembly is formed, the sensor package and magnet are biased toward one another.

7. A sensor assembly as recited in claim 1, wherein adjacent leads are spaced apart a constant distance along entire lead length.

8. A sensor assembly as recited in claim 1, wherein the leads extend from the chip body in a proximal lead plane that is parallel with the planes of said faces and spaced from the plane of the said first face so that the portion of the leads in the proximal lead plane do not extent into the plane of the said first face.

9. A sensor assembly as recited in claim 1, wherein said housing shell is provided with an inner surface with a side wall between the ends of the housing shell, which side wall has a curved portion and a second portion which forms a flat structure.

10. A magnetic-field sensor assembly comprising:
   (a) a preformed housing shell having a first end which includes an opening, and a second end which includes a window;
   (b) a sensor package including an integrated-circuit magnetic-field-sensor chip encapsulated in a protective body with first and second opposite and mutually parallel faces and a plurality of conductive leads, each lead having a proximal portion, a distal portion, and a central portion, the proximal portion of each of said plurality of leads extending from said body, the central portion of said plurality of leads extending away from the body and positioned substantially normal to the faces of the body, said sensor-package body being positioned in said housing shell part way through said window with said first body face extending outwardly from said housing shell and with said lead distal portions extending from said housing shell through said opening;
   (c) a magnet having a first end and a second end and positioned in said housing shell with said first end adjacent to said second sensor-package body face; and
   (d) an endcap adapted to close said opening in said housing shell, wherein said housing shell is provided with an outer surface between the ends of the housing shell, which outer surface has a cross-section in the form of a first truncated circle, and wherein said housing shell is provided with an inner surface with a side wall between the ends of the housing shell, which side wall has a first curved portion and a second portion which forms a flat structure, so that the inner surface, as defined by the curved portion and the flat structure, has a cross-section in the form of a second truncated circle, and grooves formed in said second portion which allow the leads to pass along the shell within the cross-sectional segment which complements said second truncated circle, so as to allow minimization of the diameter of the said first truncated circle.

11. A magnetic-field sensor assembly comprising:
(a) a preformed housing shell having a first end which includes an opening, and a second end which includes a window;
(b) a sensor package including an integrated-circuit magnetic-field-sensor chip encapsulated in a protective body with first and second opposite and mutually parallel faces and a plurality of conductive leads, each lead having a proximal portion, a distal portion, and a central portion, the proximal portion of each of said plurality of leads extending from said body, the central portion of said plurality of leads extending away from the body and positioned substantially normal to the faces of the body, said sensor-package body being positioned in said housing shell part way through said window with said first body face extending outwardly from said housing shell and with said lead distal portions extending from said housing shell through said opening;
(c) a magnet having a first end and a second end and positioned in said housing shell with said first end adjacent to said second sensor-package body face; and
(d) an endcap adapted to close said opening in said housing shell, wherein said housing shell is provided with an inner surface with a side wall between the ends of the housing shell, which side wall has a first curved portion and a second portion which forms a flat structure, said second portion being formed of parallel lands and grooves, said grooves being adapted to receive and maintain a fixed parallel spacing of the leads as they pass through the inside of the housing shell.

12. A magnetic-field sensor assembly comprising:
(a) a preformed housing shell having a first end which includes an opening, and a second end which includes a window;
(b) a sensor package including an integrated-circuit magnetic-field-sensor chip encapsulated in a protective body with first and second opposite and mutually parallel faces and a plurality of conductive leads, each lead having a proximal portion, a distal portion, and a central portion, the proximal portion of each of said plurality of leads extending from said body, the central portion of said plurality of leads extending away from the body and positioned substantially normal to the faces of the body, said sensor-package body being positioned in said housing shell part way through said window with said first body face extending outwardly from said housing shell and with said lead distal portions extending from said housing shell through said opening;
(c) a magnet having a first end and a second end and positioned in said housing shell with said first end adjacent to said second sensor-package body face; and
(d) an endcap adapted to close said opening in said housing shell, wherein said housing shell is provided with an inner surface which includes grooves which have a bottom and two upper edges, and which grooves are deep enough that when a lead is placed in the bottom of a groove, the uppermost part of the lead is substantially below the upper edges of the groove, so that a flat object resting on the upper edges of the groove will not be in contact with the lead.

13. A magnetic-field sensor assembly comprising:
(a) a preformed housing shell having a first end which includes an opening, and a second end which includes a window;
(b) a sensor package including an integrated-circuit magnetic-field-sensor chip encapsulated in a protective body with first and second opposite and mutually parallel faces and a plurality of conductive leads, each lead having a proximal portion, a distal portion, and a central portion, the proximal portion of each of said plurality of leads extending from said body, the central portion of said plurality of leads extending away from the body and positioned substantially normal to the faces of the body, said sensor-package body being positioned in said housing shell part way through said window with said first body face extending outwardly from said housing shell and with said lead distal portions extending from said housing shell through said opening;
(c) a magnet having a first end and a second end and positioned in said housing shell with said first end adjacent to said second sensor-package body face; and
(d) an endcap adapted to close said opening in said housing shell, wherein said housing shell is provided with an inner surface which includes grooves which have a bottom and two upper edges, and which grooves are deep enough that when a lead is placed in the bottom of a groove, the uppermost part of the lead is substantially below the upper edges of the groove, so that a flat object resting on the upper edges of the groove will not be in contact with the lead, and wherein the chip body is held immovable and as a result the proximal ends of the leads are held at the bottom of the grooves, and wherein the endcap is provided with endcap grooves which engage the distal portion of the leads and as a result the distal portion of the leads are held at the bottom of the grooves, so that the leads are held at the bottom of the grooves and separate from one another.

14. A magnetic-field sensor assembly comprising:
(a) a preformed housing shell having a first end which includes an opening, and a second end which includes a window;
(b) a sensor package including an integrated-circuit magnetic-field-sensor chip encapsulated in a protective body with first and second opposite and mutually parallel faces and a plurality of conductive leads, each lead having a proximal portion, a distal portion, and a central portion, the proximal portion of each of said plurality of leads extending from said body, the central portion of said plurality of leads extending away from the body and positioned substantially normal to the faces of the body, said sensor-package body being positioned in said housing shell part way through said window with said first body face extending outwardly from said housing shell and with said lead distal portions extending from said housing shell through said opening;
(c) a magnet having a first end and a second end and positioned in said housing shell with said first end adjacent to said second sensor-package body face; and
(d) an endcap adapted to close said opening in said housing shell, wherein said housing shell is provided with an inner surface which includes grooves which have a bottom and two upper edges, and which grooves are deep enough that when a lead is placed in the bottom of a groove, the uppermost part of the lead is substantially below the upper edges of the groove, so that an object resting on the upper edges of the groove will not be in contact with the lead, and wherein the chip body is held immovable and as a result the proximal ends of the leads are held at the bottom of the grooves, and wherein the endcap is provided with endcap grooves which engage the distal portion of the leads and as a result the distal portion of the leads are held at the bottom of the grooves, so that the leads are held at the bottom of the grooves and separate from one another.

15. A magnetic-field sensor assembly comprising:

(a) a preformed housing shell having a first end which includes an opening, and a second end which includes a window;

(b) a sensor package including an integrated-circuit magnetic-field-sensor chip encapsulated in a protective body with first and second opposite and mutually parallel faces and a plurality of conductive leads, each lead having a proximal portion, a distal portion, and a central portion, the proximal portion of each of said plurality of leads extending from said body in a common plane, the central portion of said plurality of leads extending away from the body and positioned substantially normal the faces of the body, said sensor-package body being positioned in said housing shell part way through said window with said first body face extending outwardly from said housing shell and with said lead distal portions extending from said housing shell through said opening;

(c) a magnet having a first end and a second end and positioned in said housing shell with said first end adjacent to said second sensor-package body face; and (d) a closing means adapted to obstruct said opening in said housing shell so that items in the shell cannot exit the shell, wherein said leads are integral, each forming an uninterrupted conductive path from said chip within said protective body through said closing means at said first end opening.

16. A sensor assembly as recited in claim 15, wherein the housing shell is preformed and of such dimensions with respect to the other components that, when the assembly is formed, the sensor package and magnet are biased toward one another.

17. A sensor assembly as recited in claim 15, wherein adjacent leads are spaced apart a constant distance along the entire lead length.

18. A sensor assembly as recited in claim 15, wherein the leads extend from the chip body in a proximal lead plane that is parallel with the planes of said faces and spaced from the plane of the said first face so that the portion of the leads in the proximal lead plane do not extend into the plane of said first face.

19. A sensor assembly as recited in claim 15, wherein said first face of said body has at least two opposite edges that are beveled, and said window of said shell has at least two opposite edges that have inwardly-facing bevels, the beveled edges of said face conforming to the bevels of said window so that the body is stopped from exiting through said window, and the body is restricted from lateral movement with respect to the shell.

20. A sensor assembly as recited in claim 15, wherein said first end of said shell includes a plurality of notches into which the leads can be bent so that the leads do not extend rearward of the opening of said first end of the shell.

21. A sensor assembly as recited in claim 15, wherein the closing means is provided with grooves each of which engages the distal portion of a separate lead as it exits the shell and as a result the distal portion of the leads are held separate as they exit the shell.

22. A sensor assembly as recited in claim 15, wherein said sensor assembly is designed to be modular so that it can be associated with a range of signal processing equipment.

23. A sensor assembly as recited in claim 15, wherein additional electronic circuitry is physically associated with the closing means and adapted to be electrically connected to at least one of the leads.

* * * * *